United States Patent [19]
Weber et al.

[11] Patent Number: 5,591,282
[45] Date of Patent: Jan. 7, 1997

[54] TIRE AND VEHICLE SYSTEM UTILIZING ASYMMETRIC SUPPORT MEMBER MOLDED TO INBOARD SIDEWALL

[75] Inventors: Michael J. Weber, Mogadore, Ohio; Stuart D. Grant, Cumberland, Md.

[73] Assignee: The Goodyear Tire & Rubber Company, Akron, Ohio

[21] Appl. No.: 518,516

[22] Filed: Aug. 23, 1995

Related U.S. Application Data

[62] Division of Ser. No. 323,974, Oct. 17, 1994, abandoned.

[51] Int. Cl.⁶ .......................... B60C 3/06; B60C 15/024
[52] U.S. Cl. .......................... 152/456; 152/523; 152/544; 180/349
[58] Field of Search ...................... 152/456, 544, 152/454, 516, 520, 523; 280/29, 1; 180/349

[56] References Cited

U.S. PATENT DOCUMENTS 3,515,196  6/1970  Floria ........................................ 152/456

FOREIGN PATENT DOCUMENTS 1327812  4/1963  France ...................................... 152/544
53-40903  4/1978  Japan ....................................... 152/456
55-91409  7/1980  Japan ....................................... 152/544

*Primary Examiner*—Geoffrey L. Knable
*Attorney, Agent, or Firm*—David E. Wheeler

[57] ABSTRACT

Improved tires designed for use in an improved tire/vehicle system having two pneumatic front tires and two pneumatic rear tires are especially effective when utilized on vehicles with a suspension system having limited camber, as in a live axle suspension system. The tires include a support member which is molded to the inboard sidewall of one or more tires in the tire/vehicle system. The inboard sidewall of a tire provides improved lateral stiffness in the tire, for cornering, and functions similar to cambering in tire/vehicle systems where cambering is not possible or where camber adjustment is limited.

7 Claims, 3 Drawing Sheets

TIRE AND VEHICLE SYSTEM UTILIZING ASYMMETRIC SUPPORT MEMBER MOLDED TO INBOARD SIDEWALL

This is a Divisional of application Ser. No. 08/323,974, on Oct. 17, 1994, now abandoned.

FIELD OF INVENTION

This invention relates generally to tires and to tire/vehicle systems designed for vehicles with suspension systems allowing little or no camber adjustability.

BACKGROUND OF THE INVENTION

One function of a vehicle's suspension system is to provide good handling in response to the driver's steering input. In many vehicles, especially high performance or racing vehicles, the vehicle's suspension system enhances handling by cambering of the vehicle wheels. In cambering, the top of a wheel and tire are tilted toward the center of the radius of the turn for maximum cornering force. For example, in Formula I racing cars, the top of each tire/wheel combination is tilted slightly toward the vehicle centerline to enable maximum cornering capability of the dominant side tires in both left and right hand turns. The cambering of the tire/wheel combination places a higher unit tread pressure on the portion of each tire tread nearest the tire's inboard shoulder, or that part of the tire tread nearest the centerline of the vehicle.

Some vehicles are designed with suspensions which do not accommodate cambering. Many popular vehicles, including some intended for high performance or racing purposes, feature suspension systems which have little or no camber. Also, in some racing applications, the sanctioning bodies forbid or limit cambering. In such situations, when a tire undergoes significant lateral forces, such as when being cornered hard under high speed, the tire sidewall may not be strong enough or stiff enough to withstand the lateral forces generated by the cornering vehicle. In such cases, the tire's sidewall "rolls" in a direction perpendicular to the vehicle's line of travel and certain portions of the tire's tread are distorted. In such case, the cornering performance of the tire can be reduced.

The present invention improves the cornering and handling performance of tires designed to be mounted on vehicles where cambering is limited or unattainable.

SUMMARY OF THE INVENTION

In accordance with the present invention, a tire\wheel system is provided.

More particularly, in a tire/vehicle system where the vehicle utilizes a suspension system in which the tires are not cambered, a support member is placed on the surface of the tire's inboard sidewall, thereby increasing the lateral stiffness of the tire and improving its performance in hard cornering and high speed applications.

According to one aspect of the invention, a pneumatic tire has a pair of annular beads, at least one carcass ply wrapped around the beads, a tread disposed over the carcass ply in a crown area of the tire, and first and second sidewalls disposed between the tread and the beads. The tire has an annular support member molded on a lower portion of a first sidewall of the tire. The second sidewall of the tire has a conventional sidewall shape configuration and does not have a support member.

According to a further aspect of the invention, the support member has a lower portion which is shaped to match a flange of an associated wheel on which the tire is mounted, and the lower portion comprises a widest portion of the support member. The support member extends radially outward to substantially a widest cross section width of the tire. The support member becomes progressively axially narrower as it approaches the widest cross section width of the tire. An axially outer portion of the support member extends from a point substantially tangent to said sidewall at the tire's widest cross section width, at an angle between 0° and 20° with respect to the equatorial plane of the tire, to a point on the first sidewall substantially coinciding with a radially outermost portion of the bead.

According to a still further aspect of the invention, a tire/vehicle system designed for high speed use on an automotive vehicle on paved road surfaces comprises a vehicle having two pneumatic front tires and two pneumatic rear tires mounted thereon, each of the tires having an annular support member molded on a lower portion of a first sidewall of each of the tires, a second sidewall of each of the tires having no support member. The first sidewall of each of said tires is an inboard sidewall for road racing or street performance application.

DEFINITIONS

Figure 1:
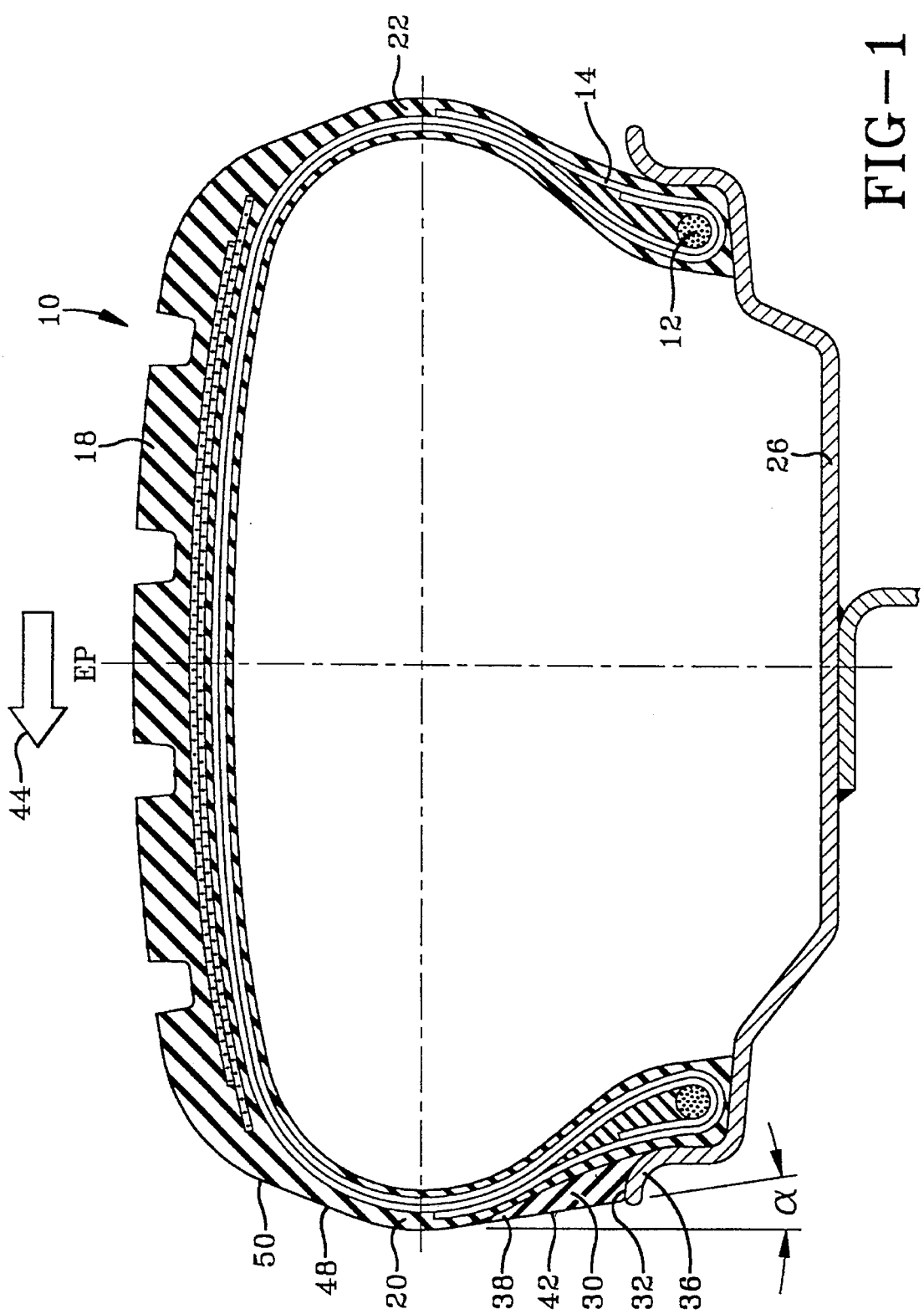
FIG. 1 illustrates a cross-sectional view of a tire of the invention.

The invention also may be better understood in the context of the following definitions, which are applicable to both the specification and to the appended claims:

"Pneumatic tire" means a laminated mechanical device of generally toroidal shape (usually an open-torus) having beads and a tread and usually made of rubber, chemicals, fabric and steel or other materials. When mounted on the wheel of a motor vehicle, the tire through its tread provides traction and contains the fluid that sustains the vehicle load.

"Equatorial plane (EP)" means the plane perpendicular to the tire's axis of rotation and passing through the center of its tread.

"Casing" means the carcass, belt structure, beads, sidewalls, and all other components of the tire excepting the tread and undertread. The casing may be new, unvulcanized rubber or previously vulcanized rubber to be fitted with a new tread.

"Tread" means a molded rubber component which, when bonded to a tire casing, includes that portion of a tire that comes into contact with the road when the tire is normally inflated and under normal load.

"Tread width" means the arc length of the tread surface in the axial direction, that is, in a plane passing through the tire's axis of rotation.

"Footprint" means the area of contact of the tire tread with a flat surface under normal load and pressure or under specified load, pressure and speed conditions.

"Groove" means an elongated void area in a tread that may extend circumferentially or laterally about the tread in a straight, curved, or zigzag manner. Circumferentially and laterally extending grooves sometimes have common portions. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Axial" and "axially" are used herein to refer to lines or directions that are substantially parallel to the axis of rotation of the tire.

"Radial" and "radially" are used herein to mean directions radially toward or away from the axis of rotation of the tire.

"Inboard" is used herein to refer to the side of the tire closest to the vehicle's centerline.

"Outboard" is used herein to refer to the side of the tire farthest from the vehicle's centerline.

"Left" is used herein to describe the side of the vehicle, wheel or tire on the left side when viewed from above in the direction of travel.

"Right" is used herein to describe the side of the vehicle, wheel or tire on the right side when viewed from above in the direction of travel.

"Live Axle" or "Beam Axle" are vehicle support systems in which the vehicle wheels cannot be cambered.

DESCRIPTION OF THE PREFERRED EMBODIMENTS

In the figures, the same numerals are used for the same components or items in the several views unless otherwise specified.

With reference to FIG. 1, a tire 10 according to the invention is illustrated. The tire 10 includes a pair of annular beads 12, at least one carcass ply 14, a tread 18, and first and second sidewalls 20,22 respectively. The tire 10 is mounted on a conventional wheel 26 in the conventional manner.

The tire 10 further includes an annular, wedge-shaped support member 30. The support member 30 is molded onto the outer surface of the lower portion of sidewall 20. The invention will be described as illustrated in FIG. 1 with the support member 30 mounted onto the first sidewall 20.

A lower portion 32 of the support member 30 is shaped to match a flange 36 of a wheel 26 on which the tire 10 is mounted. The lower portion 32 comprises the widest portion of the support member 30. The width of the support member 30 can be as wide as the axially outermost part of the flange 36 of the wheel 26. There is no advantage to the support member 30 being much more narrow, since that configuration essentially resembles the prior art tire. The support member 30 has an upper portion 38 which extends radially outward to substantially the widest cross-sectional width of the tire 10. The support member 30 becomes progressively axially narrower as it approaches the widest cross-sectional width of the tire 10.

An axially outer portion 42 of support member 30 extends radially from a point substantially tangent to the tire's first sidewall 20 at the tire's widest cross-sectional width at an angle α with respect to the EP of the tire to substantially the radially outer portion of the bead. In the preferred embodiment, α is an angle between 0° and 20° with respect to the tire's equatorial plane EP.

The support member 30 has a tensile modulus of at least 3 MPa at 300% elongation and preferably has a tensile modulus of 8–22 MPa at 300% elongation. Most preferably the modulus of support member 30 is in the range of 12 to 18 MPa.

As described previously, certain advantages are obtainable in the handling characteristics of vehicles by cambering the vehicle's tires and wheels. In vehicle suspension systems which cannot be cambered, the use of tires incorporating support member 30 can provide many of the same performance characteristics.

With continuing reference to FIG. 1, when the tire 10 is subjected to hard cornering, it experiences considerable lateral forces. For example, if the tire 10 shown in FIG. 1 was mounted on the right front tire position on a vehicle, and that vehicle was turning left at a high speed, the tire tread 18 would tend to deform from the right side of FIG. 1 toward the left, as indicated by arrow 44. If the lateral forces are great enough, the shoulder 48, the tread edge 50, and those portions of the tread 18 between the tread edge 50 and the tire's equatorial plane EP would be deformed in the direction of arrow 44. Too much deformation can distort the tread 18 and make it less effective in providing the intended handling and cornering characteristics.

Through cambering, one edge of a tire's tread is loaded more heavily and can be encouraged to retain its original orientation. For example, in Formula I racing cars, the top of each tire/wheel combination is tilted about four degrees toward the vehicle centerline.

The use of an asymmetrically reinforced tire sidewall, as illustrated in FIG. 1, can achieve a similar result. When tire 10 experiences significant lateral forces due to a hard turn to the left, the support member 30 buttresses the first sidewall 20, helps prevent distortion of sidewall 20, and consequently shoulder 48, and keeps the tread surface 18 on the road surface as intended.

Figure 2:
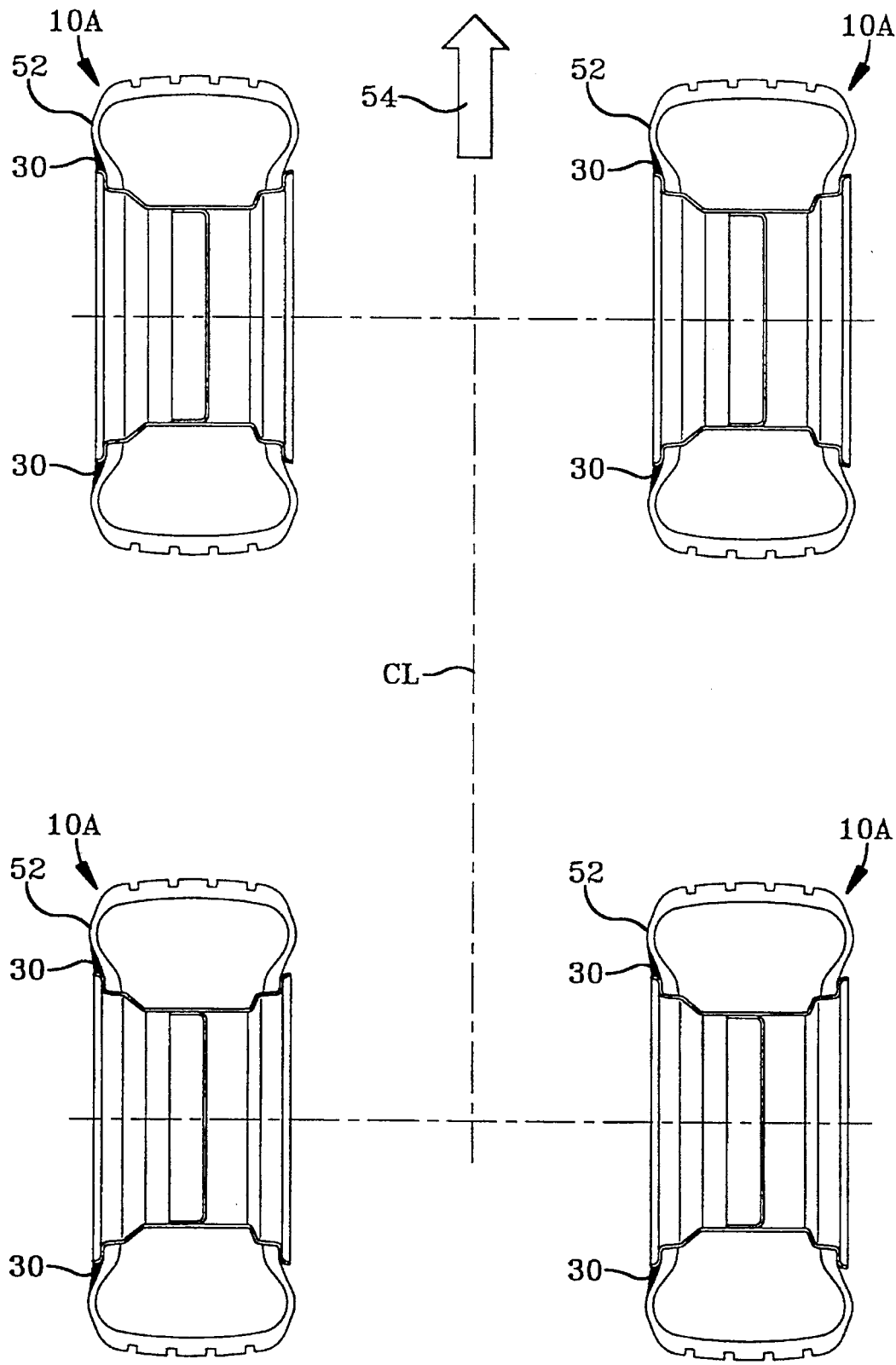
FIG. 2 illustrates a schematic, cross-sectional top view of a tire/vehicle system designed for oval track racing.
Figure 3:
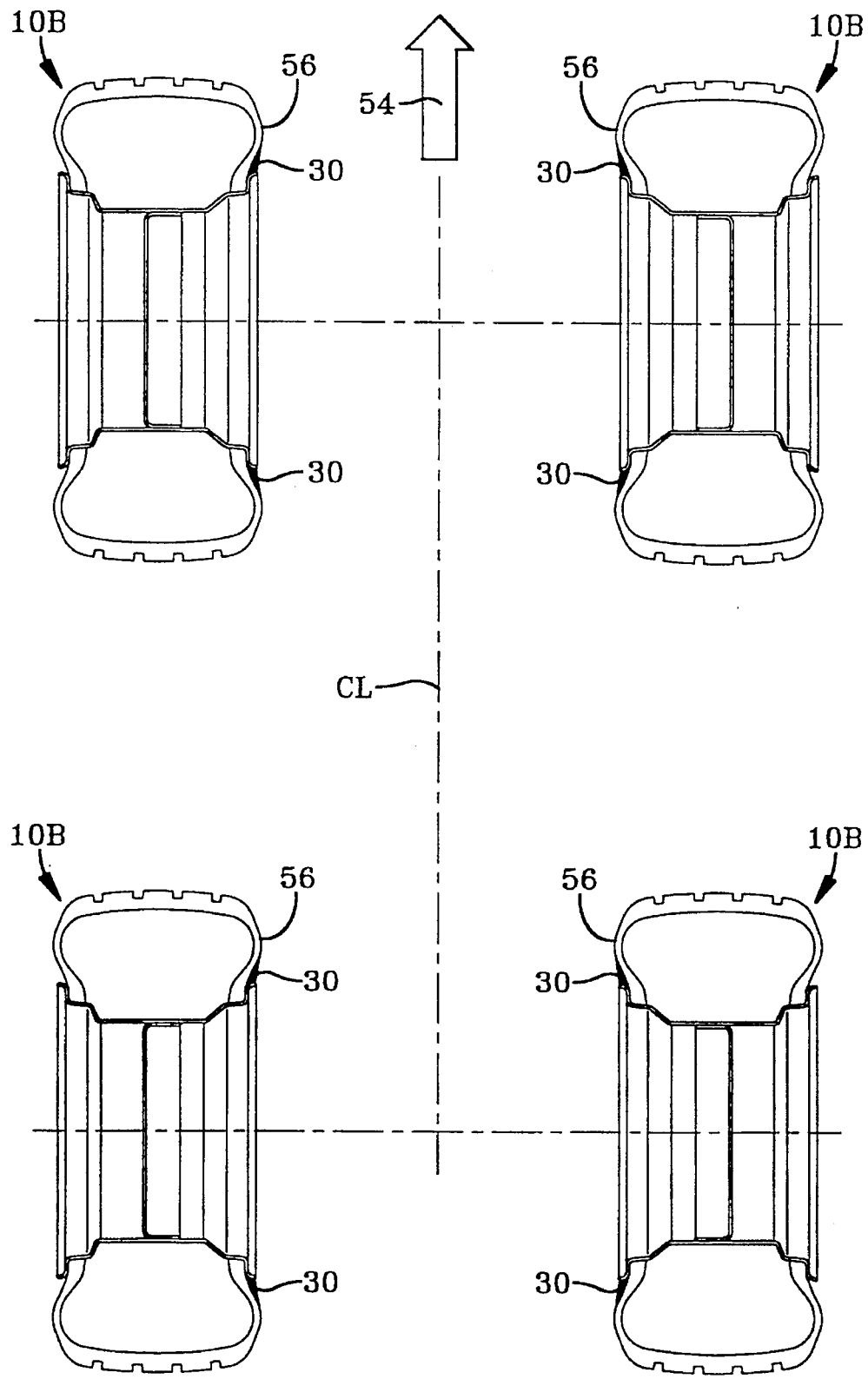
FIG. 3 is a schematic cross-sectional top view of a tire/vehicle system designed for road course racing or general use on paved surfaces.

With reference to FIGS. 2 and 3, the asymmetric design illustrated in FIG. 1 can be used to address different tire loading situations.

In FIG. 2, a schematic cross-sectional view of a tire/vehicle system is illustrated in which the left sidewall 52 of each tire 10A is supported or buttressed by the support member 30. This design of a tire/vehicle system is thought to be especially suited to those situations in which a vehicle (and tires thereon) consistently makes a majority of turns in one direction, such as an oval race track (not shown) where the vehicle is running in the direction of arrow 54 counterclockwise around the oval track.

With reference to FIG. 3, the tire/vehicle system has been configured so that the inboard shoulder 56 of each tire 10B, i.e., the shoulder nearest the vehicle centerline CL, has been buttressed. This configuration is especially good for tires intended to be utilized on conventional paved road surfaces, or in racing for tire/vehicle systems designed for road courses.

For example, in one test utilizing a vehicle equipped with rear racing tires of size 28.0×13.0–16 which incorporated the embodiment of the invention shown in FIG. 3, vehicle lap times were the second best of six tire configurations tested. More importantly, the subjective evaluation of the professional drivers indicated that the tires incorporating the invention were "the favorite", that the rear of the vehicle felt to the driver that it had more grip and never felt "loose", with "loose" meaning a failure to maintain adequate traction.

Typically, such traction was available only through cambering the rear wheels of the vehicle.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A vehicle/tire system designed for high speed use on paved road surfaces, the vehicle/tire system comprising a vehicle having two pneumatic front tires mounted thereon and two pneumatic rear tires mounted thereon, each of said tires having an annular support member molded on a lower portion of an inboard sidewall of each of said tires, an outboard sidewall of each of said tires having no support member, wherein said support member has a lower portion which is shaped to match a flange of a wheel on which said tire is mounted, and said lower portion comprises a widest portion of said support member, and said support member extends radially outward to substantially a widest cross section width of said tire and said support member becomes progressively narrower as it approaches a widest cross section width of said tire.

2. The vehicle/tire system of claim 1 wherein said vehicle has a live axle.

3. The vehicle/tire system of claim 1 in which an axially outer portion of said support member extends from a point substantially tangent to said first sidewall at said tire's widest cross section width, at an angle of between 0° and 20° with respect to said equatorial plane of said tire, to a point on said first sidewall substantially coinciding to a radially outermost portion of the bead.

4. A vehicle/tire system designed for high speed use on paved road surfaces, said vehicle having a suspension system wherein at least one of said tires is not cambered, said vehicle also having two pneumatic front tires mounted thereon and two pneumatic rear tires mounted thereon, each of said tires having an annular support member molded on a lower portion of an inboard sidewall and no additional support on an outboard sidewall of said tire, said support member having a lower portion which is shaped to match a flange of a wheel on which said tire is mounted, said lower portion comprising a widest portion of said support member, said support member extending radially outward to substantially a widest cross section width of said tire, said support member becoming progressively axially narrower as it approaches said widest cross section width of said tire, an axially outer portion of said support member extending from a point substantially tangent to said tire's sidewall at said tire's widest cross section width at an angle of 0°–20° with respect to said equatorial plane of said tire to a point on said sidewall substantially coinciding with a radially outermost portion of the bead.

5. A vehicle/tire system designed for high speed use on paved road surfaces, the tire/vehicle system comprising a vehicle having two pneumatic front tires mounted thereon and two pneumatic rear tires mounted thereon, each of said tires on one side of said vehicle having an annular support member molded on a lower portion of an inboard sidewall and no additional support on an outboard sidewall of each of said tires and on another side of said vehicle each tire has an annular support member molded on an outboard sidewall and no additional support on an inboard sidewall, wherein said support member has a lower portion which is shaped to match a flange of a wheel on which said tire is mounted, and said lower portion comprises a widest portion of said support member, and said support member extends radially outward to substantially a widest cross section width of said tire and said support member becomes progressively narrower as it approaches a widest cross section width of said tire.

6. The vehicle/tire system of claim 5 wherein said vehicle has a live axle.

7. The vehicle/tire system of claim 5 in which an axially outer portion of said support member extends from a point substantially tangent to said first sidewall at said tire's widest cross section width, at an angle of between 0° and 20° with respect to said equatorial plane of said tire, to a point on said first sidewall substantially coinciding to a radially outermost portion of the bead.

* * * * *